(12) United States Patent
Nishimura et al.

(10) Patent No.: US 6,651,610 B2
(45) Date of Patent: Nov. 25, 2003

(54) ENGINE CONTROL SYSTEM

(75) Inventors: Eiji Nishimura, Hiroshima (JP);
Takahisa Ishihara, Hiroshima (JP);
Koichi Hatamura, Hiroshima (JP);
Hiroyuki Takebayashi, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 45 days.

(21) Appl. No.: 09/961,207

(22) Filed: Sep. 24, 2001

(65) Prior Publication Data
US 2002/0038646 A1 Apr. 4, 2002

(30) Foreign Application Priority Data

Sep. 29, 2000 (JP) ........................... 2000-298960
Mar. 19, 2001 (JP) ........................... 2001-078350

(51) Int. Cl.$^7$ .............................................. F02D 41/16
(52) U.S. Cl. ...................... 123/295; 123/305; 123/90.15
(58) Field of Search ................................ 123/295, 305, 123/90.15

(56) References Cited

U.S. PATENT DOCUMENTS

| | | | | |
|---|---|---|---|---|
| 4,532,902 A | * | 8/1985 | Mizuno et al. | 123/406.47 |
| 4,762,105 A | * | 8/1988 | Beyer et al. | 123/406.19 |
| 4,886,035 A | * | 12/1989 | Tomobe et al. | 123/588 |
| 4,887,216 A | * | 12/1989 | Ohnari et al. | 701/105 |
| 4,987,871 A | * | 1/1991 | Nishikawa | 123/362 |
| 5,199,394 A | * | 4/1993 | Hartmann et al. | 123/179.1 |
| 5,970,947 A | * | 10/1999 | Iida et al. | 123/295 |
| 6,032,656 A | * | 3/2000 | Itoyama et al. | 123/568.21 |

FOREIGN PATENT DOCUMENTS

| | | |
|---|---|---|
| DE | 39 03 580 | 8/1989 |
| EP | 0 896 149 | 2/1999 |
| EP | 1 024 273 | 8/2000 |
| JP | 7-332132 A | 12/1995 |
| WO | WO 02/014668 | 2/2002 |

OTHER PUBLICATIONS

European Search Report, Application No. 01121619.9–2311, Dated Jun. 6, 2002.
Patent Abstracts of Japan, Publication No. 07–332132, "Post–Start Idle Speed Control Method for Internal Comustion Engine", Dec. 22, 1995, Inventor: Ichikawa Yasuhisa.
Patent Abstracts of Japan, Publication No. 59–032648, "Apparatus for Controlling Engine Speed"Feb. 22, 1984, Inventor: Sakamoto Toshiyuki.

* cited by examiner

*Primary Examiner*—Willis R. Wolfe
*Assistant Examiner*—Douglas A. Salser
(74) *Attorney, Agent, or Firm*—Nixon Peabody LLP; Donald R. Studebaker

(57) ABSTRACT

The present invention has an object to effectively prevent deterioration of combustion characteristics when engine temperature is low. There is provided an intake pressure controller 24 that effects control such that, when an operating condition discriminator 21 that identifies engine temperature identifies low engine temperature after engine start-up, control by an engine controller (feedback controller 23) that performs engine control on fluctuation of intake negative pressure to decrease the intake negative pressure is suppressed until the temperature of the intake passage rises to at or above a predetermined value, and such that the intake negative pressure is made larger.

3 Claims, 8 Drawing Sheets

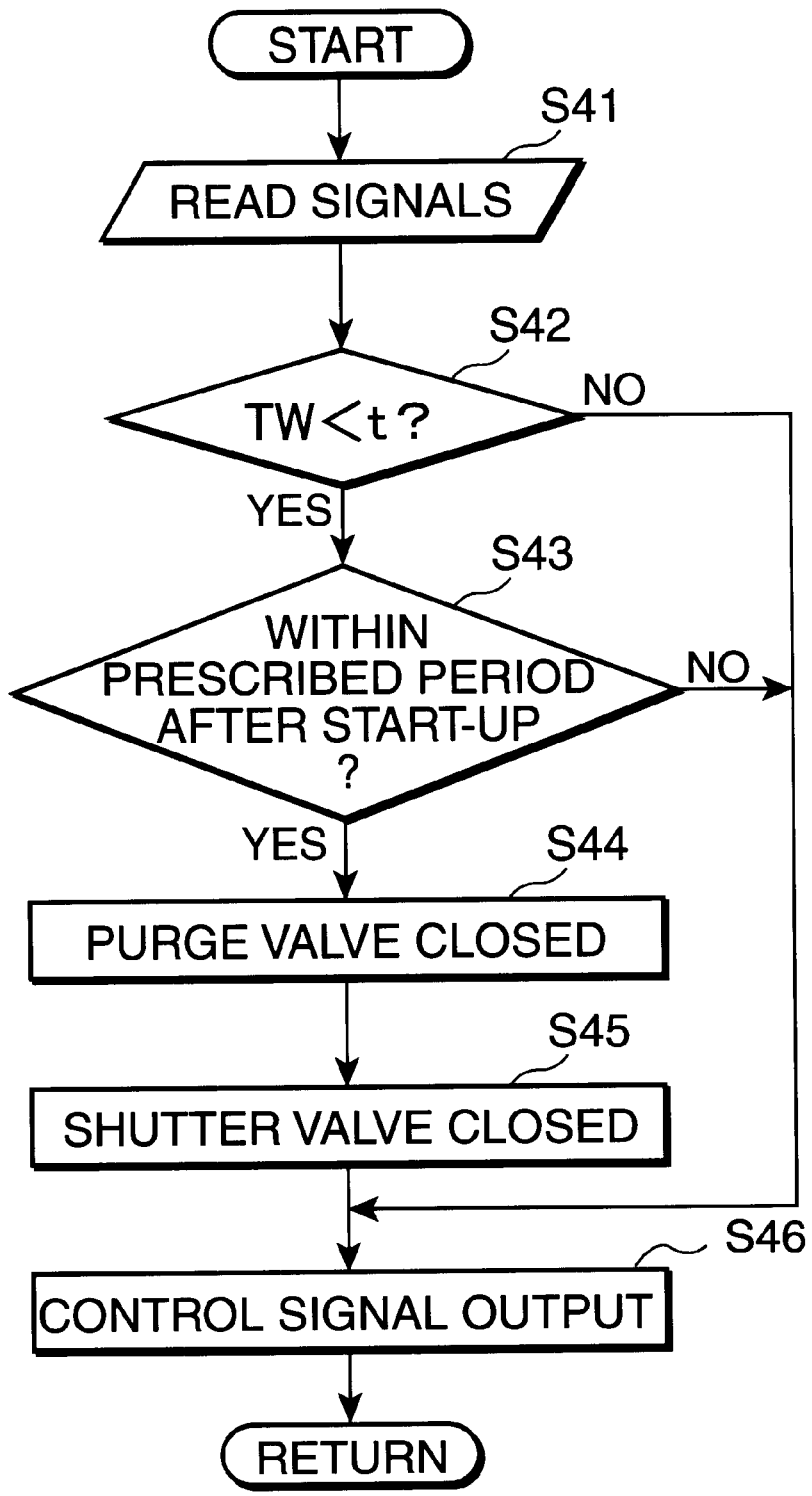

ENGINE CONTROL SYSTEM

BACKGROUND OF THE INVENTION

1. Field of the Invention

The present invention relates to an engine control system that controls the operating condition of an engine mounted in an automobile etc.

2. Description of the Related Art

Conventionally, as illustrated in for example Laid-open Japanese Patent Publication No. Hei 7-332132, in an engine control system arranged so as to control the idling speed of the engine by adjusting the rate of intake passing through the engine intake bypass passage, rise in engine speed was curbed by lowering the torque generated immediately after start-up by lowering the bypass intake rate for a predetermined time by a predetermined amount in response to engine temperature, when a predetermined engine speed had been reached, after start-up of engine operation.

Also, the engine control system as described in the above publication is constructed such that, when the engine temperature drops below a predetermined value, the rate of intake that is admitted to the engine combustion chamber is increased by inhibiting the aforesaid control for lowering the bypass intake rate, in order to maintain an optimum condition in regard to fuel consumption.

However, in the idling condition of the engine, basically, the rate of intake is small, so when, as mentioned above, the engine temperature is low, even if control is exercised so as to increase somewhat the rate of intake admitted into the combustion chamber of the engine, there is the problem that no particularly large effect can regard to accelerating vaporization and atomization of the fuel by the air current can be expected; rather, since the intake air negative pressure is small, vaporization and atomization of the fuel adhering to the intake passage are poor and combustion characteristics deteriorate. It should be noted that, when heavy gasoline of high density is employed as fuel, there is the problem that, if the intake and negative pressure is lowered by increasing the intake rate as described above, fuel combustion characteristics are severely impaired.

SUMMARY OF THE INVENTION

In view of the above, an object of the present invention is to provide an engine control system wherein deterioration of combustion characteristics when engine temperature is low can be effectively prevented.

In order to achieve the above object, an engine control system, according to the invention, comprises temperature discrimination means that identify engine temperature and intake pressure control means that, when said temperature discrimination means identifies low engine temperature after engine start-up, executes control to increase the intake negative pressure with respect to the normal level until the temperature of an intake passage has risen to at or above a predetermined value.

With the above construction, when the temperature discrimination means identifies low engine temperature after engine start-up, the intake pressure control means executes control whereby the intake negative pressure is made larger than normally, until the temperature of the intake passage has risen to at or above the predetermined temperature, thereby promoting vaporization and atomization of fuel adhering to the intake passage, so good combustion characteristics of the fuel can be ensured.

These and other objects, features and advantages of the present invention will become more apparent upon reading of the following detailed description along with the accompanied drawings.

BRIEF DESCRIPTION OF THE DRAWINGS

FIG. 8 is a flow chart illustrating a further example of the control operation that is performed by an engine control system according to the present invention.

DESCRIPTION OF THE PREFERRED EMBODIMENTS

Figure 1:
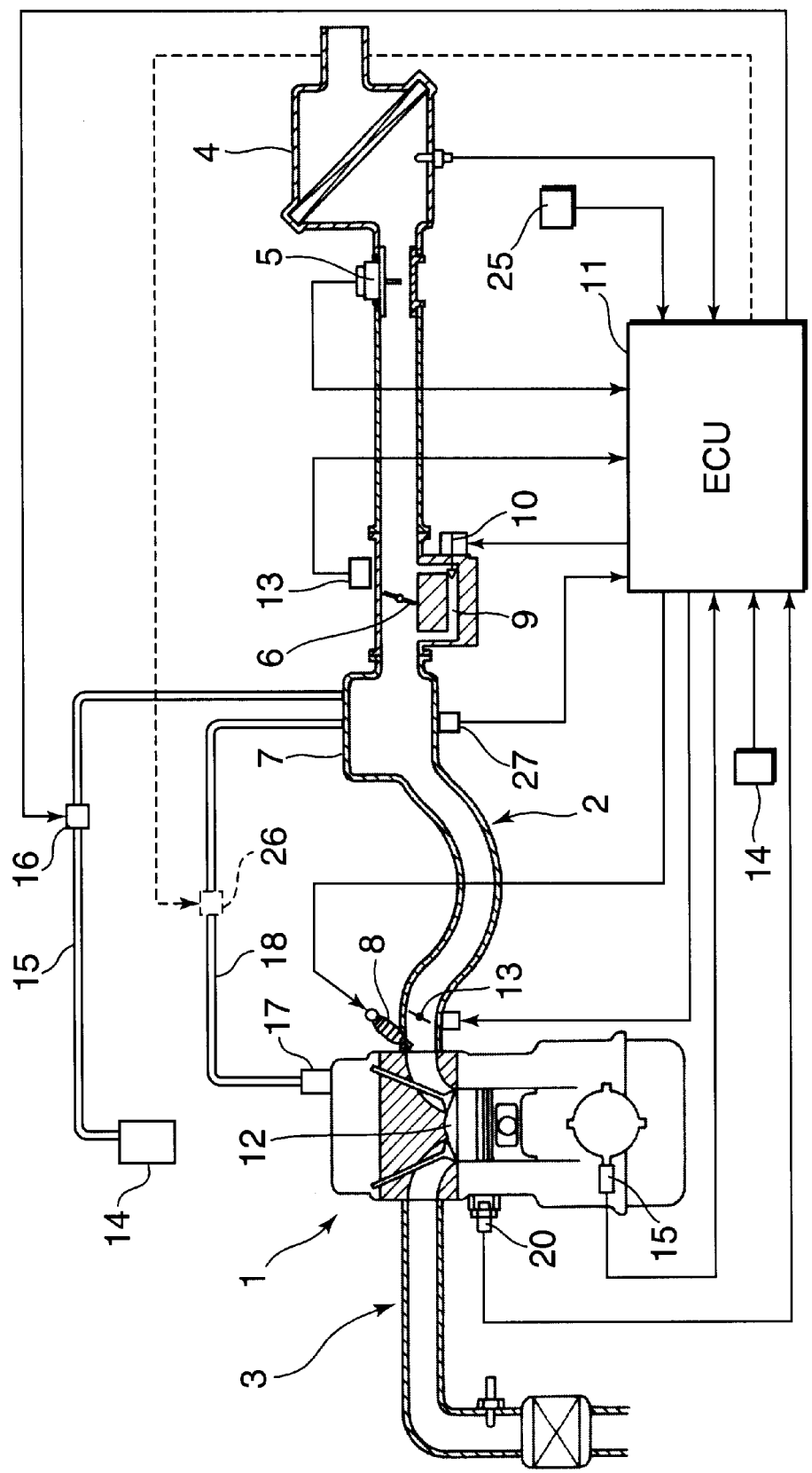
FIG. 1 is a diagram illustrating the overall construction of an engine provided with an engine control system according to an embodiment of the present invention.

FIG. 1 is a diagram of an engine provided with an engine control system according to an embodiment of the present invention. This engine is provided with an engine body 1, intake passage 2, and exhaust passage 3. On this intake passage 2, there are provided, in order from the upstream side, an air cleaner 4, air flow meter 5, throttle valve 6, surge tank 7, and fuel injector 8.

On intake passage 2, there is provided a bypass passage 9 that bypasses the section where throttle valve 6 is arranged; an idling control valve 10 is arranged on this bypass passage 9. The rate of intake that is admitted to combustion chamber 12 of engine body 1 through bypass passage 9 is arranged to be controlled by idling control valve 10 being controlled in accordance with a control signal that is output from the engine control unit (ECU) 11.

Negative pressure sensor 27 comprising a negative pressure sensor that detects intake negative pressure is provided in surge tank 7; on the downstream side of surge tank 7, there is provided an intake shutter valve 13 that opens and closes intake passage 2. This intake shutter valve 13 is arranged so as to be driven to effect opening or closure in accordance with a control signal from ECU 11, and is provided on the second passage side of intake passage 2, which is branched into a first passage and second passage. When the second passage is closed by this intake shutter valve 13, the flow rate of the intake supplied into combustion chamber 12 from the side of the first passage is increased, causing a swirl to be generated.

Also, in this engine, there is provided vaporized fuel supply means comprising a canister 14 that intakes vaporized fuel generated in a fuel tank, not shown, a purge passage 15 that supplies the vaporized fuel stored in this canister 14 into a surge tank of intake passage 2, and a purge valve 16 that opens and closes this purge passage 15. Thus, the flow of vaporized gas with respect to combustion chamber 12 of engine body 1 is controlled by driving purge valve 16 in accordance with the control signal which is output from ECU In addition, in the cylinder head of engine body 1, there is provided a PCV valve 17 constituting a blow-by gas return flow device; blow-by gas that is delivered from this PCV valve 17 is thus arranged to be supplied into surge tank 7 of intake passage 2 through blow-by gas passage 18.

Figure 2:
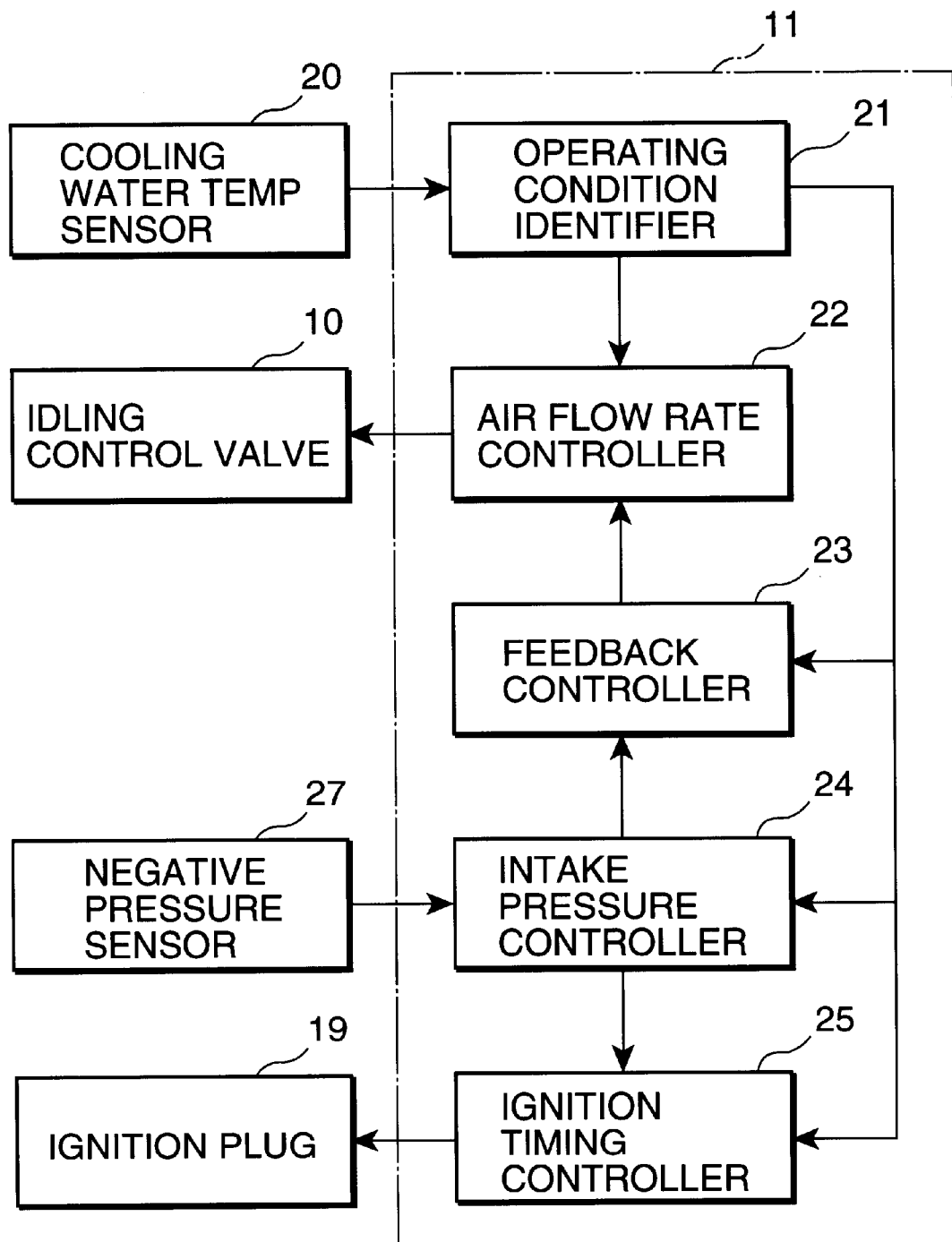
FIG. 2 is a block diagram illustrating a specific construction of the engine control system.

In ECU 11, as shown in FIG. 2, there are provided: operating condition discriminator 21 that identifies the operating condition of the engine; air flow rate controller 22 that controls the rate of intake in accordance with the engine operating condition; feedback controller 23 that performs control such that the engine speed coincides with the target idling speed, by adjusting the rate of intake during engine idling operation; intake pressure controller 24 that exercises control such that the intake negative pressure becomes large after engine start-up, if required; and ignition timing controller 25 that controls the fuel ignition timing in accordance with operating condition of the engine.

The operating condition discriminator 21 has the function of a temperature identifier that identifies engine temperature using for example a detection signal of a cooling water temperature sensor 20 that detects the cooling water temperature of the engine, and a function of identifying whether or not the engine is in idling operating condition, using an engine speed sensor that detects the engine speed and the detection signal of a throttle sensor that detects the degree of opening of throttle valve 6. Also, the operating condition discriminator 21 is arranged to identify whether the fuel vaporization and atomization are in an unsatisfactory condition or not, by determining whether or not the change of angular velocity of the output shaft is at or above a predetermined value, using the detection signal of a crank angle sensor.

Air flow rate controller 22 is arranged to control the rate of intake supplied into combustion chamber 12 of engine body 1, by adjusting the rate of air passing through bypass passage 9, by outputting a control signal responsive to engine operating condition to the actuator of an idling control valve 10.

When operating condition discriminator 21 determines that the engine is in an idling operating condition, feedback controller 23 is arranged so as to perform feedback control so as to make the engine speed coincide with the target idling engine speed by calculating a feedback control quantity of idling control valve 10 in accordance with the deviation between the actual engine speed and the target idling engine speed and adjusting the intake rate in accordance with this feedback control quantity.

Intake pressure controller 24 is arranged such that, when after engine start-up the operating condition discriminator 21 determines that the engine temperature is low, it increases the rate of intake compared with that under normal conditions, by suppressing control in the direction of increasing intake rate by feedback controller 23 during the period in which the temperature of intake passage 2 comprising an intake port etc formed in the cylinder head or in the vicinity of the fuel injector 8 has risen to at or above a predetermined value.

Specifically, in the aforesaid idling operating condition of the engine, if the engine speed is lower than the target idling engine speed i.e. when the engine is in an operating condition of elevated engine speed produced by increased rate of intake, it is arranged that the idling control valve 10 is not driven in the direction of increasing rate of intake i.e. in the opening direction, by for example disabling the feedback control of the rate of intake by the feedback controller 23; in this way, it is arranged that the intake negative pressure in the combustion chamber 12 becomes larger than normally.

Also, intake pressure controller 24 is arranged such that, if, after engine start-up, operating condition discriminator 21 determines that the engine temperature is low, it executes control so as to positively increase the intake negative pressure beyond the normal value, by driving idling control valve 10 in a closing direction, by decreasing the demanded air flow rate set by air flow rate controller 22 until the temperature of intake passage 2 has risen to at or above a predetermined value.

It should be noted that the intake pressure controller 24, if it is found that the engine temperature after engine start-up is low, if operating condition discriminator 21 determines that fuel vaporization and atomization is in an unsatisfactory condition, for example only if it is found that there is a condition of large changes of angular velocity of the output shaft due to fuel of high density being employed, until the temperature of the intake passage 2 rises to at or above a predetermined value, suppresses the control performed by feedback controller 23 to increase the rate of intake, and executes control such as to lower the demanded air flow rate set by the air flow rate controller 22.

Ignition timing controller 25 is arranged so as to set an optimum ignition timing in response to engine operating condition such that normally, fuel vaporization and atomization are not in an unsatisfactory condition. Thus, when, during ordinary operation, the engine temperature is found to be low after engine start-up, control is exercised such that the ignition timing angle of the ignition plug 19 is delayed until the temperature of intake passage 2 has risen to at or above a predetermined value. In normal operation, when timing angle delay control by ignition timing controller 25 is executed, control is executed by air flow rate controller 22 in order to increase the rate of intake so as to compensate for the drop of engine torque corresponding to this angle delay control.

Also, if it is found that the engine temperature is low after engine start-up, ignition timing controller 25 is arranged so as to execute feedback control such that the engine speed coincides with the target idling engine speed, by advancing the ignition timing in response to suppression of the control performed by the feedback controller 23 in the direction in which the intake negative pressure becomes smaller, until the temperature of the intake passage 2 rises to at or above a predetermined value.

Figure 3:
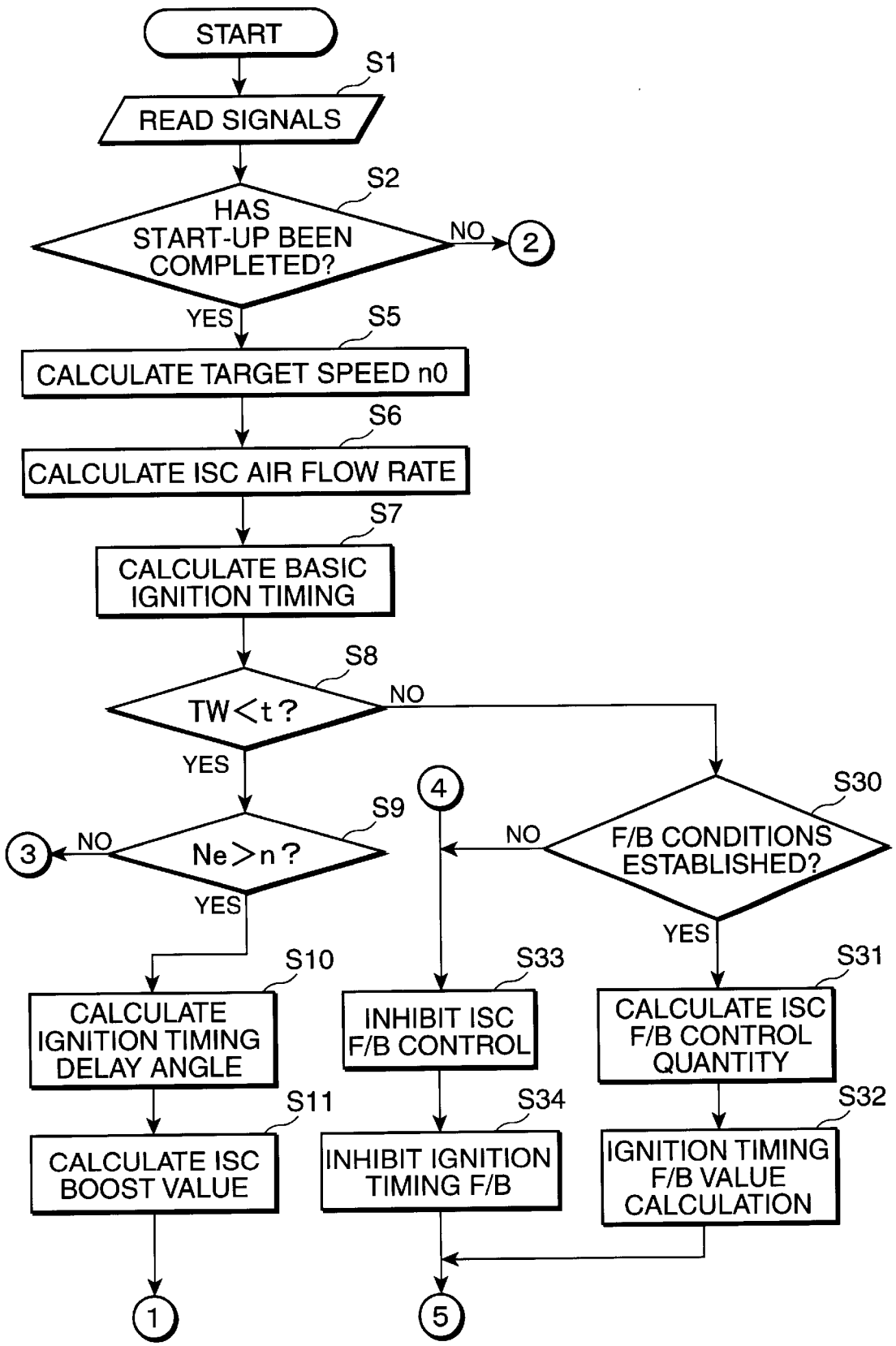
FIG. 3 is a flow chart illustrating the first half of the control operation that is performed by an engine control system according to the present invention.
Figure 4:
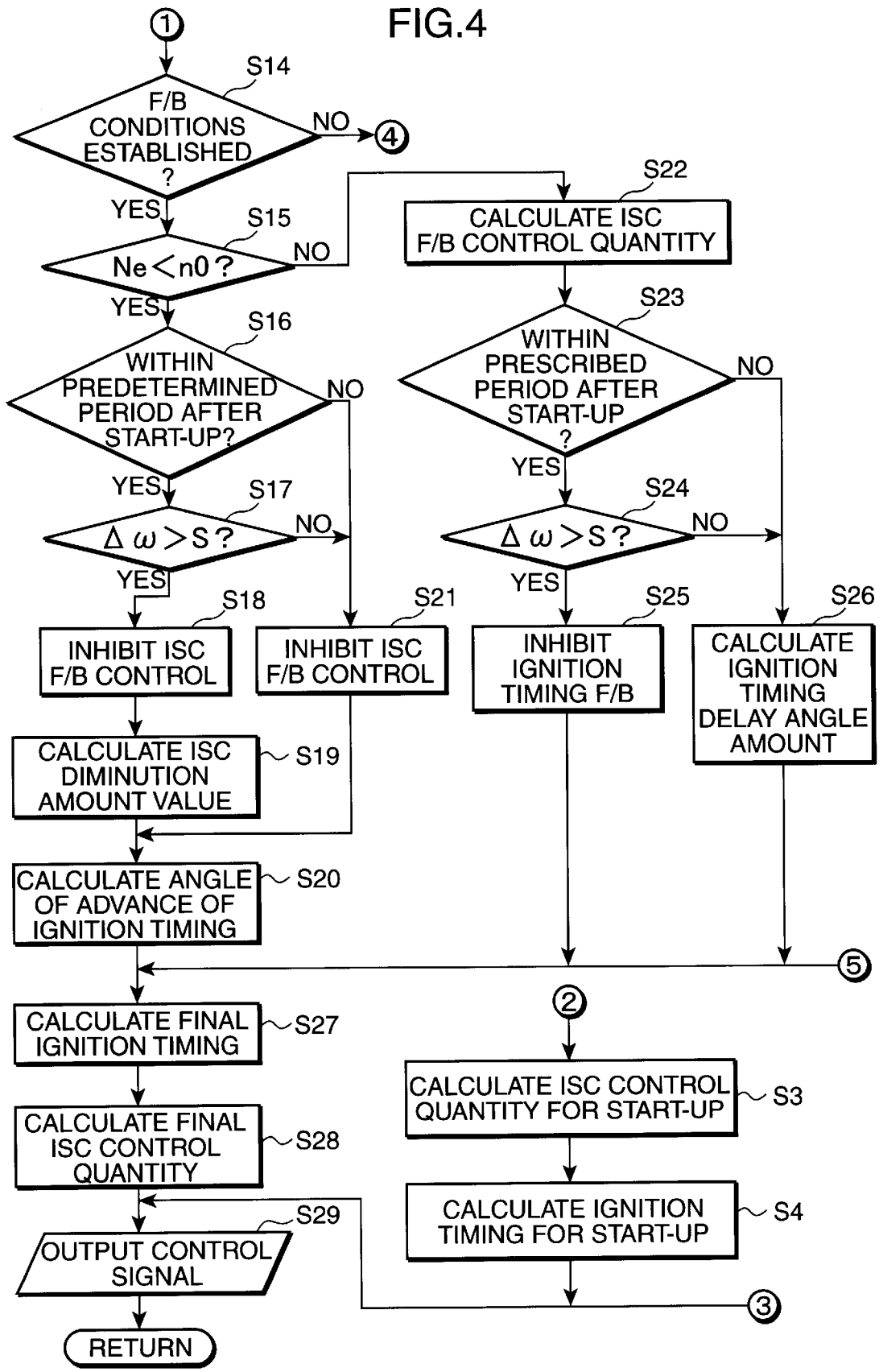
FIG. 4 is a flow chart illustrating the second half of the control operation that is performed by an engine control system according to the present invention.

The control operation performed by the engine control system will now be described with reference to the flow chart shown in FIG. 3 and FIG. 4. When the above control operation is commenced, after the various sensor detection signals etc have been read (step S1), it is ascertained whether or not engine start-up has been completed (step S2), using the detection signal of the starter sensor etc. If the result obtained in this step S2 is NO, the intake air control quantity for engine start-up (ISC control quantity) is calculated (step S3) and the ignition timing for engine start-up is calculated (step S4).

If in step S2 Yes is found, confirming that engine start-up has been completed, the target engine speed n0 corresponding to the engine condition, the intake flow rate (ISC air flow rate) and basic ignition timing are calculated (steps S5, S6 and S7). If for example the engine is under no-load condition, the target engine speed n0 is calculated using a map which is set beforehand, taking the cooling water temperature TW of the engine as a parameter; the value of the target engine speed n0 is set to a larger value, the lower the cooling water temperature TW of the engine. Also, the ISC air flow rate is calculated using a map which is set beforehand, taking for example the target engine speed n0 as a parameter; it is set to a larger value, the larger the value of the target engine speed n0.

Next, the operating condition discriminator 21 identifies whether or not (step S8) the engine cooling water temperature TW is less than a predetermined value "t". This predetermined value "t" is the temperature of the cooling water providing a standard for evaluation of whether or not engine warm-up has been completed and is set for example at about 40° C.

If in this step S8 YES is determined i.e. it is determined that the engine temperature is low, it is ascertained whether or not the condition is that in which control after engine start-up has been completed, by determining (step S9) whether or not the engine speed is at or above a predetermined value n, for example 2000 rpm. If the determination result in this step S9 is YES, the amount of delay of the ignition timing angle needed in order to accelerate engine warm-up is calculated (step S10) and the value of the amount of increase (ISC increase amount value) of the intake flow rate corresponding this amount of ignition timing angle delay is calculated (step S11).

After this, a determination is made (step S14) as to whether or not the conditions for execution of feedback control (F/B) by feedback controller 23 are established; if the result of the determination is YES, a determination is made as to whether or not the engine speed "ne" is less than the target idling engine speed n0 (step S15). If, in this step S15, the result of the determination is YES, a determination is made as to whether or not the condition has been reached prior to elevation of the temperature of the intake passage 2 to at or above the predetermined temperature i.e. at or above the temperature at which fuel vaporization and atomization can be sufficiently promoted even without performing the above intake negative pressure control, by ascertaining (step S16) whether or not the time is within the predetermined period after engine start-up.

If in this step S16 the result of the determination is YES i.e. it is confirmed that the time is within the predetermined time after engine start-up, a determination is made (step S17) as to whether or not the angular speed variation Δw of the output shaft is larger than the predetermined value "s". If the result of the evaluation in this step S17 is YES i.e. it is ascertained that the engine is in a condition in which changes of engine speed are large, due for example to use of fuel of high density, feedback of the intake flow rate by feedback controller 23 is inhibited (step S18). As a result, a feedback control value in the direction such as would increase the intake flow rate is prevented from being set, so control in the direction to reduce the intake negative pressure is suppressed.

Also, using the deviation between the engine speed "ne" and the target engine speed n0, air flow rate controller 22 calculates a reduction value (ISC reduction amount value) for reducing the demanded air flow rate that has been set (step S19), and calculates the amount of advance of ignition timing angle (step S20) in order to effect a corresponding rise in the engine speed "ne". Normally, when the intake rate is lowered, engine speed is lowered, but, in step S19, when it is believed that engine speed is in a lowered condition due to deterioration of fuel vaporization and atomization caused by the use of fuel of high density and low engine temperature in the predetermined period after engine start-up the rate of intake is therefore lowered, increasing the intake negative pressure and consequently promoting fuel vaporization and atomization and contrariwise making it possible to suppress the drop of engine speed.

On the other hand, if in step S16 the result of the determination is NO i.e. it is found that the temperature of intake passage 2 has reached a predetermined value or more on lapse of a predetermined time after engine start-up, or in step S17 the result of the determination is NO, if it is ascertained that the angular speed variation Δw of the output shaft is of a predetermined value "s" or more, feedback control of the intake flow rate by feedback controller 23 is commenced and the ISC F/B control quantity i.e. the value of increase in the rate of intake is calculated (step S21); processing then shifts to step S20, in which the lead angle amount of the ignition timing required in order to increase the engine speed "ne" is calculated.

Also, in step S15 if the result of the determination is NO i.e. it is found that the engine speed "ne" is greater than or equal to the target idling speed n0, the ISC F/B control quantity for executing feedback control by the feedback controller 23 of the intake flow rate i.e. the reduction value of the intake for lowering the engine speed "ne" is calculated (step S22) and it is then ascertained whether or not the time is within the predetermined period after engine start-up (step S23).

If in step S 23 the result of the determination is YES i.e. it is found that the time is within the predetermined time after engine start-up, a determination is made (step S24) as to whether or not the angular speed variation Δw of the output shaft is greater than the predetermined value "s"; if the result of this determination is YES, feedback control of the ignition timing by ignition timing controller 25 is inhibited (step S25). The reason for thus disabling of feedback control of the ignition timing is that, if the ignition timing were returned, the ISC F/B control quantity i.e. the amount of reduction of intake calculated in step S22 would be made smaller; this is therefore prevented.

On the other hand, in step S23, if the result of the determination is NO i.e. if it is found that the temperature of the intake passage 2 has reached at or above the predetermined value after the lapse of the predetermined time after engine start-up, or if in step S24 the result of the determination is NO i.e. it is found that the angular speed variation Δw of the output shaft is at or above the predetermined value "s", the amount of delay of the ignition timing angle necessary to lower the engine speed "ne" is calculated (step S26).

Thus, the final ignition timing is calculated (step S 27) based on the basic ignition timing calculated in step S7, the amount of ignition timing delay angle calculated in step S10, and the ignition timing lead angle amount calculated in step S20 or ignition timing delay angle amount calculated in step S26, and the final ISC control quantity is calculated (step S28) based on the ISC air flow rate calculated in step S6, the ISC rate increase value calculated in step S11, the ISC rate decrease value calculated in step S19, and the ISC F/B control value calculated in step S21 or step S22, and control signals corresponding to these final ignition timing and final control quantities are respectively output (step S29) to the ignition plug 19 and ISC control valve 10.

As described above, after engine start-up, if the result of the determination in step S17 is YES i.e. the temperature identifying means constructed by operating condition discriminator 21 finds that the engine temperature is low, and the result of the determination in step S8 is YES i.e. it is found that the angular speed variation Δw of the output shaft is larger than predetermined value "s", until the result of the determination in step S16 is NO i.e. it is confirmed that the temperature of the intake passage 2 has risen to at or above the predetermined value, control in the direction such as to weaken the intake negative pressure performed by feedback controller 23 i.e. control such as to increase the intake flow rate is inhibited and control such as to positively increase the intake negative pressure i.e. control such as to decrease the demanded amount of intake air set by the air flow rate controller 22 are executed, thereby ensuring that sufficient intake negative pressure is maintained within the intake passage in the vicinity of the intake port and within combustion chamber 12.

On the other hand, if the result of the determination in step S8 is NO i.e. it is found that the engine is in the warm-up condition, a determination is made (step S30) to establish whether or not the conditions for execution of feedback control (F/B) by feedback controller 23 are established; if the result of this determination is YES, the ordinary feedback control during engine idling operation is executed, by calculating the ISCF/B control quantity and the ignition timing F/B control value required to make the engine speed "ne" equal to the target idling speed n0 (steps S31,S32).

Also, if the result of the determination in step S30 is NO i.e. it is found that the conditions for feedback control (F/B) are not established, the ISCF/B control and ignition timing F/B control are inhibited (steps S33, S34) and the ordinary intake air flow rate control and ignition timing control corresponding to the engine operating condition are performed.

As described above, owing to the provision of engine controller comprising feedback controller 23 that perform engine control on fluctuation of the intake negative pressure, temperature identifying means comprising operating condition discriminator 21 that identifies the engine temperature, and intake pressure controller 24 that suppresses performance of intake negative pressure control by this feedback controller 23, when, after engine start-up, this operating condition identifier 23 identifies low engine temperature, until the temperature of the intake passage 2 rises to at or above the predetermined value, the intake pressure controller 24 is arranged to suppress the control performed by feedback controller 23 in the direction such as would make the intake negative pressure smaller, so that the intake negative pressure becomes larger than normally; consequently, the advantage is obtained that even if gasoline of high density is employed as fuel, deterioration of combustion characteristics can be effectively prevented.

Figure 5A:
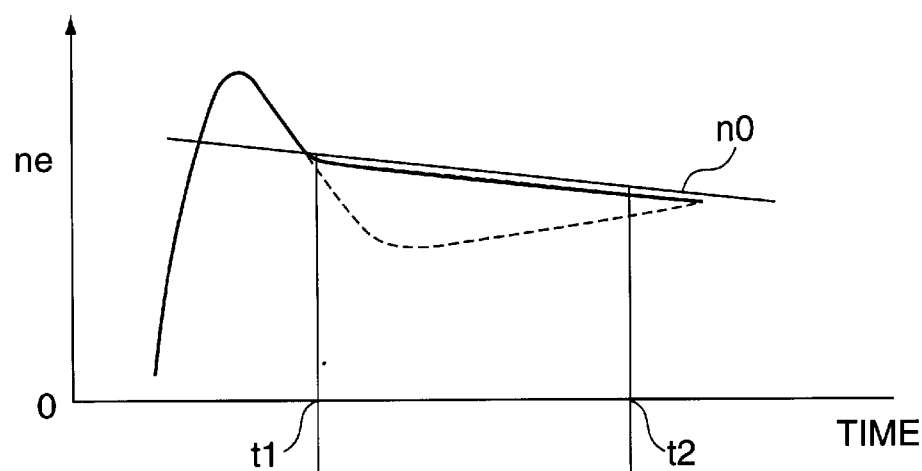
FIGS. 5A, 5B, and 5C are time charts, each of which illustrating the control operation that is performed by an engine control system according to the present invention.
Figure 5B:
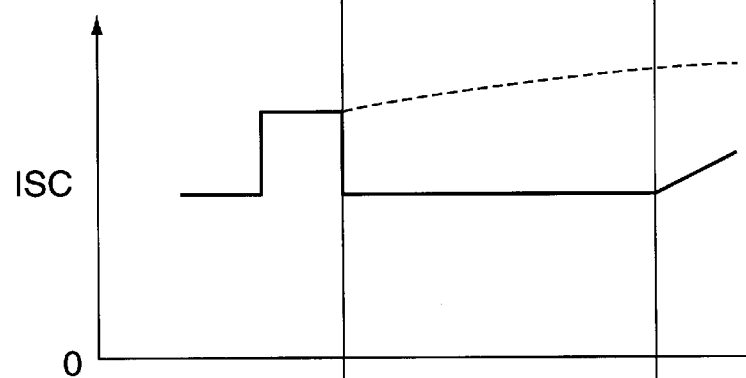
Figure 5C:
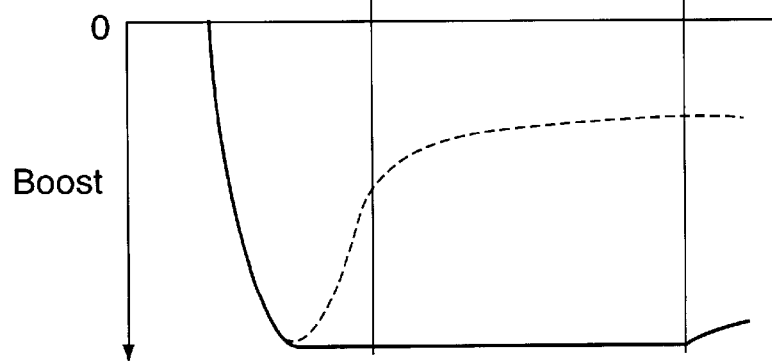
Figure 6A:
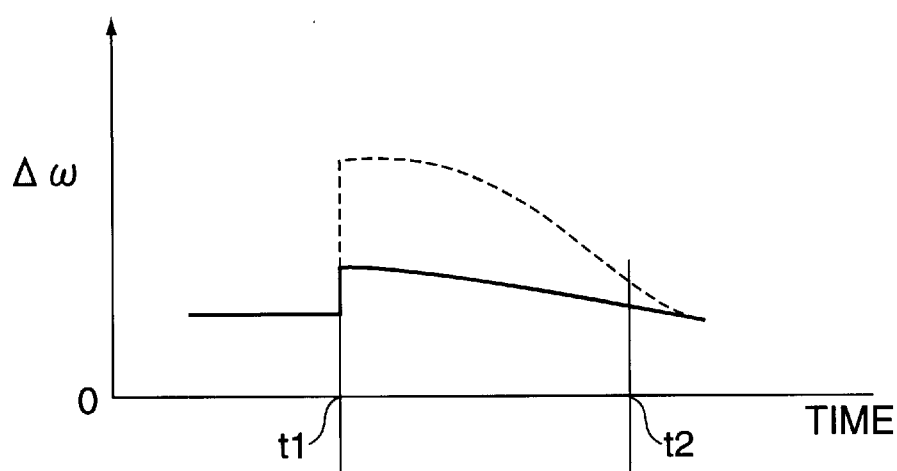
FIGS. 6A and 6B are time charts, each of which illustrating the control operation that is performed by an engine control system according to the present invention.

Specifically, if the engine temperature after start-up is low and, as shown by the broken line in FIG. 5A, the engine speed "ne" at the time point t1 where control after engine start-up ceases is smaller than the target engine speed n0, conventionally, in order to raise the engine speed "ne" in response to this deviation, as shown by the broken line in FIG. 5B, control was exercised so as to increase the intake rate ISC; as a result, the intake negative pressure boost tended to become small as shown by the broken line in FIG. 5C. As a result, it was not possible to effectively promote fuel vaporization and atomization, resulting in the problems that fuel combustion characteristics became poor and, as shown by the broken line in FIG. 6A, fluctuations and variations Δw of the output shaft became marked and, as shown by the broken line in FIG. 5A, the engine speed "ne" fell.

If, to deal with this, a construction is adopted to hold the intake negative pressure boost at a large value as shown by the solid line in FIG. 5C by inhibiting the control which would increase the intake flow rate ISC as shown by the solid line in FIG. 5B until the temperature in the intake passage to rises to at or above a predetermined value (t1 to t2), when low engine temperature is identified after engine start-up, vaporization and atomization of fuel etc adhering to the intake passage 2 because of the low pressure within combustion chamber 12 can be promoted. As a result, the advantage is obtained that, as shown by the solid line in FIG. 6A, by maintaining the combustion characteristics of the fuel in a good condition, angular fluctuations and variations Δw of the output shaft can be suppressed and, as shown by the solid line in FIG. 5A, lowering of the engine speed "ne" can be prevented.

In particular, in this embodiment, since a construction is adopted such that diminution of the intake negative pressure is suppressed by disabling the control exercised by the engine controller consisting of feedback controller 23 that directly controls the intake air flow rate, after engine start-up it is possible for the temperature identification means consisting of operating condition discriminator 21, if this identifies low engine temperature, to perform control such as to maintain the combustion characteristics in a good condition by effectively suppressing the diminution of the intake negative pressure until the temperature of the intake passage 2 has risen to at or above the predetermined value.

Figure 6B:
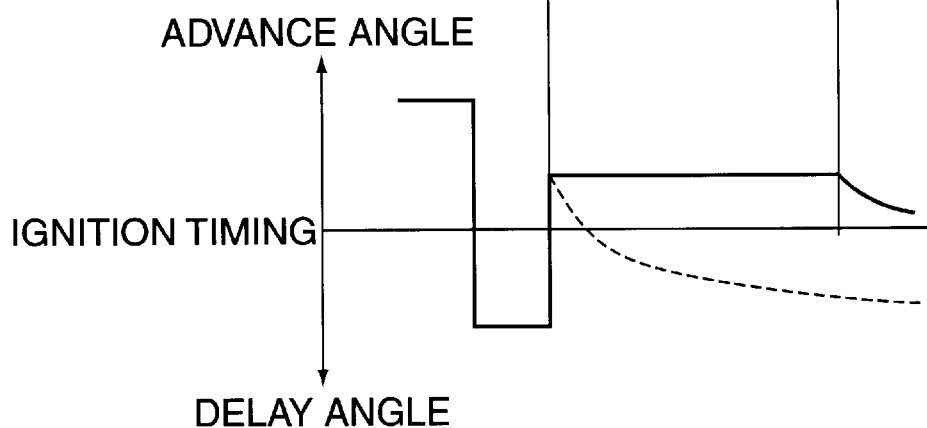

Also, if a construction is adopted as illustrated in the above embodiment whereby if low engine temperature is identified after engine start-up, as shown in FIG. 6B ignition timing controller 25 executes feedback control such as to make the engine speed "ne" coincide with the target idling speed n0 by controlling (advancing the angle) of the ignition timing until the temperature of intake passage 2 has risen to at or above a predetermined temperature, the benefit is obtained that even though diminution of the intake negative pressure has been arranged to be suppressed by disabling the control exerted by feedback controller 23 as described above, occurrence of the situation that the engine speed "ne" greatly departs from the target engine speed n0 can be effectively prevented, making it possible to stabilize the engine speed "ne".

By controlling the fuel injection amount that is injected from fuel injector 8 by fuel injection controller, not shown, instead of control of the ignition timing or together with this control of ignition timing, even if an arrangement is adopted in which feedback control such as to make the engine speed "ne" coincide with the target idling engine speed n0 is performed, it is possible to prevent occurrence of the situation that the engine speed "ne" greatly departs from the target engine speed n0, thereby effectively stabilizing the engine speed "ne".

Also, instead of the embodiment described above wherein when low engine temperature is identified after engine start-up, in step S18, control by feedback control means 23 is inhibited until the temperature of intake passage 2 has risen to at or above the predetermined value, thereby suppressing the diminution of intake negative pressure and in step S19 the demanded air flow rate is reduced, a construction may be adopted wherein control in the direction such as to increase the intake rate is suppressed by altering the control characteristic of the feedback controller 23 in accordance with the detection value of the negative pressure sensor.

Figure 7:
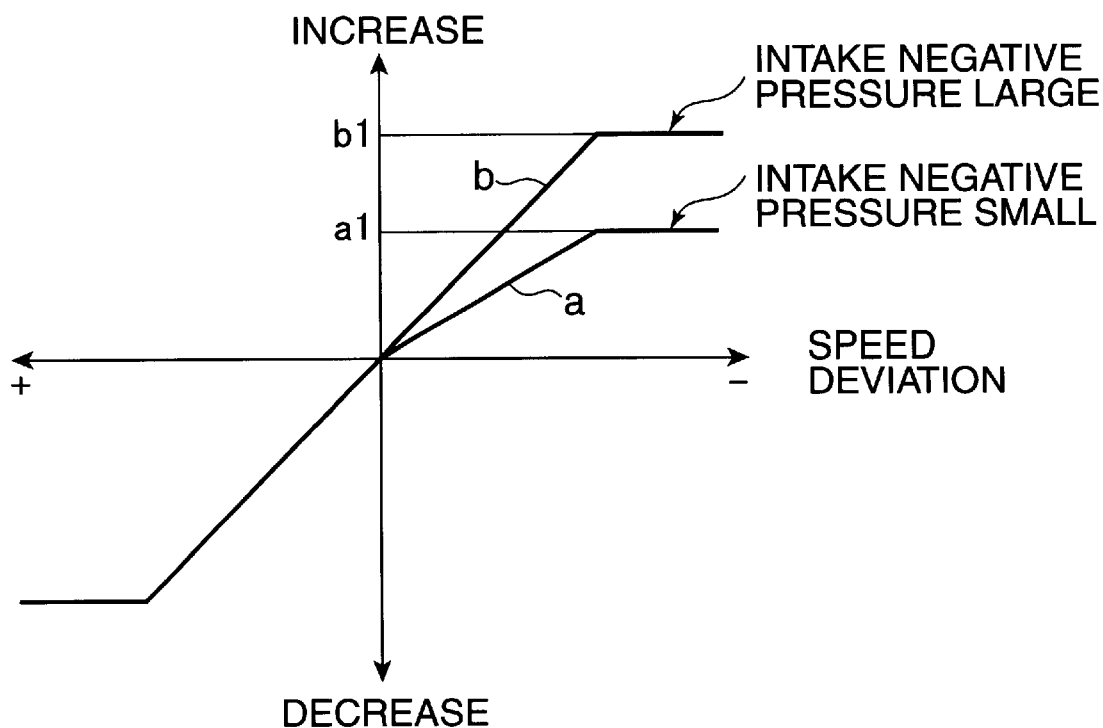
FIG. 7 is a graph illustrating the relationship between intake negative pressure and the feedback control value.

For example a construction may be adopted whereby, as shown in FIG. 7, the feedback control gain that is set by the feedback controller 23 is altered in response to the intake negative pressure detected by negative pressure sensor 27 so that, when this intake negative pressure is small, control in the direction such as to increase the intake air flow rate is suppressed by setting the gradient of the graph that is used to set the control gain a, i.e. the feedback control quantity in the increasing region of intake flow rate in which the speed deviation between the target engine speed and the actual engine speed is negative, to a smaller value than the control gain b when the intake negative pressure is large.

Also, as shown in FIG. 7, if the intake negative pressure detected by negative pressure sensor 27 is small, it is possible to suppress control in the direction such as to increase the intake air flow rate, by setting the upper limiting value al of the feedback control quantity in the region of increasing intake amount in which the speed deviation between the target engine speed and actual engine speed is negative to a value smaller than the upper limiting value b1 when the intake negative pressure is large.

If it is found as above that the intake negative pressure is small and the engine temperature after engine start-up is low, it is possible to effectively promote vaporization and atomization of fuel adhering to the intake passage by setting the feedback control gain of the intake air flow rate used by the feedback controller 23 to a small value until the temperature of the intake passage 2 has risen to at or above a predetermined value; increase in the intake flow rate can also be suppressed in a straightforward and effective manner by adopting a construction in which the upper limiting value thereof is set to a small value.

Also, with the above embodiment, a construction is adopted whereby, if it is found that the engine temperature is low after engine start-up, control is exercised by intake pressure controller 24 so as to suppress control by the engine controller comprising feedback controller 23 in the direction such as to decrease the intake negative pressure, until the temperature of intake passage 2 has risen to at or above or the predetermined value, and the demanded air flow rate set by air flow rate controller 22 is reduced, thereby positively reducing the intake air flow rate; consequently, the advantage is obtained that intake negative pressure is effectively increased and the vaporization of the fuel can therefore be promoted.

It should be noted that, instead of the above embodiment, which was constructed such that intake negative pressure could be increased by adjusting the intake air flow rate by controlling the feedback controller 23 or air flow rate controller 22 by the intake pressure controller 24, it would be possible to adopt a construction in which intake negative pressure is increased by driving an intake flow control valve comprising intake shutter valve 13 that controls intake flow in the second passage of intake passage 2 in a closing direction, or by driving a flow control valve comprising purge valve 16 that controls the flow of auxiliary fluid comprising vaporized fuel that is admitted into combustion chamber 12 in a closing direction.

For example, as shown in the flow chart of FIG. 8, after reading the detection signals etc of the various sensors (step S41), operating condition discriminator 21 identifies whether or not the cooling water temperature TW of the engine is less than a predetermined value "t" (step S42) and, if the result of this determination is YES, a determination is performed (step S43) as to whether or not a predetermined time has elapsed after engine start-up. The same benefits as in the above embodiment can also be obtained with a construction in which, when the result of the determination in step S43 is YES, admission of vaporized fuel into combustion chamber 12 is restricted by putting purge valve 16 into closed condition and intake flow is restricted by putting intake shutter valve 13 into closed condition, thereby positively increasing the intake negative pressure until the temperature of intake passage to rises to at or above the predetermined value, if after engine start-up the operating condition discriminator 21 determines that engine temperature is low.

It should be noted that the same benefits as in the above embodiment can be obtained by adopting a construction wherein a flow control valve comprising an opening/closing valve 26 is provided in a blow-by gas passage 18 as shown by the broken line in FIG. 1 and, if operating condition discriminator 21 determines that the engine temperature is low after engine start-up, it is arranged to positively intensify the intake negative pressure by restricting the inflow of blow-by gas into the combustion chamber 12, by driving the flow control valve comprising opening/closing valve 26 in a closing direction until the temperature of intake passage 2 has reached at or above the predetermined value.

Also, in the above embodiment, in which it is arranged for intake controller 24 to perform control such as to increase the intake negative pressure if low engine temperature is identified after engine start-up, until the temperature of intake passage 2 has reached at or above a predetermined value, it is desirable to adopt a construction such as to execute feedback control so as to make the engine speed "ne" coincide with the target idling speed n0 by using ignition timing controller 25 to control the ignition timing or by using a fuel injection controller, not shown, to control the fuel injection rate, in order to make it possible to stabilize the engine speed "ne" by preventing occurrence of the situation that there is a large discrepancy between engine speed "ne" and the target speed n0.

Furthermore, in the above embodiment, owing to the adoption of a construction such that elevation of the temperature of the intake passage 2 to at or above a predetermined value is detected based on lapsed time after engine start-up, there is the advantage that the period of disabling of control such as to suppress diminution of the intake negative pressure by the intake pressure controller 24 or of control such as to make the intake negative pressure large can be appropriately determined by a straightforward construction. It should be noted that, instead of the above embodiment, it could be arranged to detect whether or not the temperature of intake passage 2 has risen to at or above the predetermined temperature by using the detected value of a temperature sensor that detects the engine cooling water temperature TW or exhaust gas temperature.

Also, the adoption of a construction as in the embodiment described above such that intake pressure controller 24 suppresses control which would decrease the intake negative pressure with respect to the normal level and executes control which positively increases the intake negative pressure until the temperature of the intake passage 2 has risen to at or above a predetermined value only when operating condition discriminator 21 has ascertained that the engine temperature after engine start-up is low and, based on angular speed variation Δw of the output shaft, that vaporization and atomization of the fuel are in an unsatisfactory condition has the advantage that, in a condition in which fuel vaporization and atomization are good, execution of control by the intake pressure controller 24 can be prevented from interfering with idling speed control and, in a condition in which fuel vaporization and atomization are poor, good combustion characteristics can be ensured by appropriate execution of control by intake pressure controller 24.

It should be noted that, in place of the above embodiment which is arranged so that whether or not fuel vaporization and atomization are in a poor condition is ascertained based on the angular speed variation Δw of the output shaft, an arrangement could be adopted wherein whether or not fuel vaporization and atomization are in a poor condition is ascertained based on a lowered condition of engine speed, a lean condition of the air/fuel ratio, or high fuel density.

Also, with the above embodiments, since these are constructed such that, on identification of low engine temperature after engine start-up in a condition with good fuel vaporization and atomization, control is arranged to be performed by the aforesaid ignition timing controller 25 to raise the exhaust gas temperature by delaying the ignition timing angle, and that control is arranged to be performed by air flow rate controller 24 to raise the engine output by increasing intake air flow rate in correspondence with this ignition timing angle delay control, there is the advantage that early activation of the exhaust gas cleaning catalyst which is arranged in exhaust passage 3 can be achieved without lowering engine output.

Also, as described above, if low engine temperature after engine start-up is identified in a condition with poor fuel vaporization and atomization, since the intake negative pressure is weakened in response to increase in this intake air flow rate when control such as to increase the intake air flow rate in response to this ignition timing angle delay control is performed by air flow rate controller 24 until the temperature of the intake passage 2 has risen to at or above a predetermined value, the advantage is obtained that a marked benefit i.e. a marked benefit in terms of promoting fuel vaporization and atomization is achieved by suppressing control to diminish intake negative pressure by intake pressure controller 24 or by executing control to increase intake negative pressure.

Summing up the aforementioned disclosures, one aspect of the present invention comprises temperature discrimination means that identify engine temperature and intake pressure control means that, when said temperature discrimination means identifies low engine temperature after engine start-up, executes control to increase the intake negative pressure with respect to the normal level until the temperature of an intake passage has risen to at or above a predetermined value.

With the above construction, when the temperature discrimination means identifies low engine temperature after engine start-up, the intake pressure control means executes control whereby the intake negative pressure is made larger than normally, until the temperature of the intake passage has risen to at or above the predetermined temperature, thereby promoting vaporization and atomization of fuel adhering to the intake passage, so good combustion characteristics of the fuel can be ensured.

In an engine control system according to the above aspect, further comprises engine control means that executes engine control on fluctuation of intake negative pressure wherein said intake pressure control means is constructed so as to increase the intake negative pressure with respect to the normal level, when, after engine start-up, said temperature discrimination means identifies low engine temperature, by suppressing control by said engine control means in the direction such as to diminish intake negative pressure, until the temperature of the intake passage has risen to at or above a predetermined value.

With the above construction, when low engine temperature after engine start-up is identified, a sufficiently large value of the intake negative pressure is maintained by suppressing control by the engine control means in the direction such as to reduce intake negative pressure until the temperature of the intake passage has risen to at or above the predetermined value, thereby promoting vaporization and atomization of fuel adhering to the intake passage, so good combustion characteristics of the fuel can be ensured.

In the aforementioned invention, the engine control means may further comprise feedback control means that perform feedback control of the intake air flow rate such that during idling operation of the engine the engine speed is made to coincide with the target idling engine speed and the intake pressure control means is arranged to increase intake negative pressure with respect to the normal level by suppressing control by the feedback control means in the direction such as to increase intake air flow rate if low engine temperature after engine start-up is identified, until the temperature of the intake passage has risen to at or above the predetermined value.

With the above construction, by suppressing the control by the feedback control means in the direction such as to increase intake air flow rate when low engine temperature is identified after engine start-up until the temperature of the intake passage has risen to at or above the predetermined value, control to maintain the intake negative pressure at a large value can be effectively performed.

In the aforementioned invention, an engine control system may further comprise negative pressure detection means that detect intake negative pressure wherein the intake pressure control means is constructed to suppress control in the direction such as to increase the intake air flow rate, by altering the control characteristic of the feedback control means in accordance with the value detected by the negative pressure detection means, when low engine temperature is identified after engine start-up, until the temperature of the intake passage has risen to at or above the predetermined value.

With the above construction, when low engine temperature after engine start-up is identified, by altering the control characteristic of the feedback control means in accordance with the detected value of the negative pressure detection means until the temperature of the intake passage has risen to at or above the predetermined value, increasing control of the intake air flow rate is suppressed so the intake negative pressure is maintained at a suitable value.

In the aforementioned invention, when the intake negative pressure detected by the negative pressure detection means is small, the intake pressure control means may be constructed to suppress control in the direction such as would increase the intake air flow rate, by setting the feedback control gain of the feedback control means in the region of increasing intake air flow rate to a value smaller than that when the intake negative pressure is large.

With the above construction, by setting the feedback control gain of the feedback control means in the region of increasing intake air flow rate to a small value when the intake negative pressure is small and low engine temperature after engine start-up is identified, until the temperature of the intake passage rises to at or above the predetermined value, increase of the intake air flow rate is appropriately and effectively suppressed, enabling vaporization and atomization of fuel etc adhering to the intake passage to be promoted.

In the aforementioned invention, when the intake negative pressure detected by the negative pressure detection means is small, the intake pressure control means may be constructed to suppress control in the direction such as would increase the intake air flow rate, by setting the upper limiting value of the feedback control quantity of the feedback control means in the region of increasing intake air flow rate to a value smaller than that when the intake negative pressure is large.

With the above construction, when the intake negative pressure is small and low engine temperature is identified after engine start-up, by setting the upper limiting value of the feedback control quantity of the feedback control means to a small value in the increasing region of the intake air flow rate until the temperature of the intake passage rises to at or above a predetermined value, vaporization and atomization of fuel etc adhering to the intake passage is promoted by suppressing increase of intake air flow rate in a straightforward and effective manner.

In the aforementioned invention, if low engine temperature is identified after engine start-up, feedback control may be executed by controlling at least one of the ignition timing or fuel injection rate so as to make the engine speed coincide with the target idling engine speed, until the intake passage temperature has risen to at or above the predetermined value.

With the above construction, when low engine temperature is identified after engine start-up, fuel vaporization and atomization are promoted by the intake pressure control means executing control such as to increase the intake negative pressure with respect to the normal level, until the temperature of the intake passage rises to at or above the predetermined temperature, and, by controlling at least one of the ignition timing or fuel injection rate, it is possible to make the engine speed coincide with the target idling speed.

In the aforementioned invention, the engine control system may further comprise air flow rate control means for controlling the intake air flow rate in accordance with engine operating condition the intake pressure control means is constructed so as to increase the intake negative pressure, when, after engine start-up, low engine temperature is identified, by reducing the demanded air flow rate that is set by the air flow rate control means, until the temperature of the intake passage has risen to at or above a predetermined value.

With the above construction, when low engine temperature is identified after engine start-up, the intake pressure control means executes control such as to positively increase the intake negative pressure by decreasing the demanded air flow rate set by the air flow rate control means until the temperature of the intake passage has risen to at or above the predetermined value, so fuel vaporization and atomization are effectively promoted, and good fuel combustion characteristics are ensured.

In the aforementioned invention, the intake pressure control means may be constructed so as to increase the intake negative pressure by driving an intake flow control valve that controls intake flow in a closing direction when low engine temperature after engine start-up is identified, until the temperature of the intake passage rises to at or above the predetermined value.

With the above construction, when low engine temperature after engine start-up is identified, the intake pressure control means executes control such as to positively increase the intake negative pressure by driving the intake flow control valve in a closing direction until the temperature of the intake passage rises to at or above the predetermined value, so fuel vaporization and atomization are effectively promoted and good fuel combustion characteristics are ensured.

In the aforementioned invention, the intake pressure control means may be constructed so as to increase the intake negative pressure by driving a flow control valve that controls flow of auxiliary fluid comprising vaporized fuel or blow-by gas etc that is fed into the combustion chamber in a closing direction when low engine temperature after engine start-up is identified, until the temperature of the intake passage rises to at or above the predetermined value.

With the above construction, when low engine temperature after engine start-up is identified, the intake pressure control means executes control such as to positively increase the intake negative pressure by decreasing the auxiliary fluid that is fed into the combustion chamber, until the temperature of the intake passage rises to at or above the predetermined value, so fuel vaporization and atomization are effectively promoted and good combustion characteristics are ensured.

In the aforementioned invention, the temperature discrimination means may be constructed to detect elevation of the temperature of the intake passage to at or above the predetermined value, based on the lapse of time after engine start-up.

With the above construction, whether or not the temperature of the intake passage has risen to at or above the predetermined value is appropriately detected by a straightforward construction, based on the lapse of time after engine start-up.

In the aforementioned invention, the engine control system may further comprise operating condition discrimination means that identifies whether or not fuel vaporization and atomization are in an unsatisfactory condition, based on a lowered condition of engine speed or angular speed variation of the output shaft etc, and is constructed so as to execute control such as to increase the intake negative pressure only when low engine temperature after engine start-up is identified and an unsatisfactory condition of fuel vaporization and atomization are ascertained by the operating condition discrimination means, until the temperature of the intake passage rises to at or above the predetermined value.

With the above construction, in a condition in which fuel vaporization and atomization are good, execution of control by the intake pressure control means is prevented from interfering with execution etc of idling speed control and, if the fuel vaporization and atomization condition is unsatisfactory, the intake pressure control means executes control such as to increase the intake negative pressure, thereby ensuring good combustion characteristics.

In the aforementioned invention, the engine control system further comprise ignition timing control means that delays the ignition timing angle when low engine temperature is identified after engine start-up and air flow rate control means that increases the intake air flow rate in response to this ignition timing angle delay control, constructed such that control of ignition timing and intake air flow rate by the timing angle control means and air flow rate control means is executed if the operating condition discrimination means ascertains that fuel vaporization and atomization are not in an unsatisfactory condition.

With this construction, if the fuel vaporization and atomization are not in an unsatisfactory condition and low engine temperature after engine start-up is identified, the ignition timing control means executes control to delay the ignition timing angle and the air flow rate control means executes control such as to increase the intake air flow rate corresponding to this ignition timing angle delay control, so it becomes possible to activate the exhaust gas cleaning catalyst provided in the exhaust passage at an early stage without provoking a drop in engine output.

This application is based on Japanese application serial Nos. 2000-298960 and 2001-78350, filed in Japanese Patent Office on Sep. 29, 2000 and Mar. 19, 2001 respectively, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An engine control system comprising:
   a temperature discrimination means for identifying engine temperature,
   an intake pressure control means for executing control to increase the intake negative pressure with respect to a normal level until the temperature of an intake passage has risen to at or above predetermined value when said temperature discrimination means identifies low engine temperature after engine start-up;
   an engine control means for executing engine control on fluctuation of intake negative pressure, said engine control means including a feedback control means for performing feedback control of the intake air flow rate such that during idling operation of the engine the engine speed is made to coincide with a target idling engine speed, said intake pressure control means is arranged to increase intake negative pressure with respect to the normal level by suppressing control by said feedback control means in a direction to increase intake air flow rate if low engine temperature after engine start-up is identified, until the temperature of the intake passage has risen to at or above the predetermined value;
   a negative pressure detection means for detecting intake negative pressure, and
   wherein said intake pressure control means suppresses control in a direction to increase the intake air flow rate, by altering the control characteristic of said feedback control means in accordance with a value detected by said negative pressure detection means, when low engine temperature is identified after engine start-up, until the temperature of the intake passage has risen to at or above a predetermined value such that when the intake negative pressure detected by the negative pressure detection means is small, said intake pressure control means suppresses control in a direction to increase the intake air flow rate, by setting the feedback control gain of said feedback control means in a region of increasing intake air flow rate, to a value smaller than that when the intake negative pressure is large.

2. An engine control system comprising:
   a temperature discrimination means for identifying engine temperature,
   an intake pressure control means for executing control to increase the intake negative pressure with respect to a normal level until the temperature of an intake passage has risen to at or above a predetermined value when said temperature discrimination means identifies low engine temperature after engine start-up;
   an engine control means for executing engine control on fluctuation of intake negative pressure said engine control means including a feedback control means that performs feedback control of the intake air flow rate such that during idling operation of the engine the engine speed is made to coincide with a target idling engine speed, said intake pressure control means is arranged to increase intake negative pressure with respect to the normal level by suppressing control by said feedback control means in a direction to increase intake air flow rate if low engine temperature after engine start-up is identified, until the temperature of the intake passage has risen to at or above the predetermined value;
   a negative pressure detection means for detecting intake negative pressure, and
   wherein said intake pressure control means suppresses control in a direction to increase the intake air flow rate, by altering the control characteristic of said feedback control means in accordance with a value detected by said negative pressure detection means, when low engine temperature is identified after engine start-up, until the temperature of the intake passage has risen to at or above a predetermined value such that when the intake negative pressure detected by the negative pressure detection means is small, said intake pressure control means is constructed to suppress control in a direction to increase the intake air flow rate, by setting the upper limit value of the feedback control quantity of said feedback control means in a region of increasing intake air flow rate, to a value smaller than that when the intake negative pressure is large.

3. An engine control system comprising:
   a temperature sensor for identifying engine temperature,
   an intake pressure control unit which executes control of the intake pressure to increase intake negative pressure with respect to a normal level until the temperature of an intake passage has risen to at or above a predetermined value when said temperature sensor identifies low engine temperature after engine start-up;
   an engine control unit which executes engine control on fluctuation of the intake negative pressure including a feedback control unit which performs feedback control of the intake air flow rate such that during idling operation of the engine the engine speed is made to coincide with a target idling engine speed, said intake pressure control unit is arranged to increase intake negative pressure with respect to the normal level by suppressing control by said feedback control unit in a direction to increase intake air flow rate if low engine temperature after engine start-up is identified, until the temperature of the intake passage has risen to at or above the predetermined value;
   a negative pressure detector which detects the intake negative pressure, and
   wherein said intake pressure control unit suppresses control in a direction to increase the intake air flow rate, by altering the control characteristic of said feedback control unit in accordance with a value detected by said negative pressure detector, when low engine temperature is identified after engine start-up, until the temperature of the intake passage has risen to at or above a predetermined value such that when the intake negative pressure detected by the negative pressure detector is small, said intake pressure control unit suppresses control in a direction to increase the intake air flow rate, by setting the feedback control gain of said feedback control unit in a region of increasing intake air flow rate, to a value smaller than that when the intake negative pressure is large.

* * * * *